US012605812B2

(12) United States Patent
Kuzmic et al.

(10) Patent No.: US 12,605,812 B2
(45) **Date of Patent: *Apr. 21, 2026**

(54) HOSE CLAMP PLIERS

(71) Applicant: A&E INCORPORATED, Racine, WI (US)

(72) Inventors: Jeffrey J Kuzmic, Wind Lake, WI (US); Billy Greuel, Waterford, WI (US)

(73) Assignee: A&E Incorporated, Racine, WI (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/299,548

(22) Filed: Apr. 12, 2023

(65) Prior Publication Data

US 2024/0342880 A1 Oct. 17, 2024

(51) Int. Cl.
*B25B 25/00* (2006.01)

(52) U.S. Cl.
CPC .................................. *B25B 25/005* (2013.01)

(58) Field of Classification Search
CPC ......... B25B 5/005; B25B 5/04; B25B 147/02; B25B 147/04; B25B 147/00; B25B 147/20; B25B 2227/20; B25B 2227/146; B25B 2227/30; Y10T 24/1484; Y10T 1429/53783
USPC .................................... 81/9.3, 486, 485, 487
See application file for complete search history.

(56) References Cited

U.S. PATENT DOCUMENTS 1,119,532 A * 12/1914 Parks ........................ B25B 7/02 81/415
3,383,963 A 5/1968 Vondrachek
5,590,573 A * 1/1997 Detable ................. B25B 25/005 81/426
5,865,072 A 2/1999 Jerdee
6,128,975 A 10/2000 Schley et al.
6,389,937 B1 5/2002 Kang
7,313,984 B1 1/2008 Eggert et al.
9,180,576 B2 11/2015 Wu (Continued)

FOREIGN PATENT DOCUMENTS

DE 202009001662 6/2009
DE 202016004144 8/2016

(Continued)

OTHER PUBLICATIONS

International Search Report and Written Opinion of the ISA mailed Jun. 3, 2024, as cited in corresponding application PCT/US2024/019532; 6 pgs.

(Continued)

*Primary Examiner* — Robert F Neibaur

(57) ABSTRACT

A hose clamp pliers for use with both a wire spring hose clamp and a band spring hose clamp is disclosed. Two arms of the hose clamp pliers each rotatably carry contact points of different configurations. The first contact point is designed to receive, in a first position, an end portion of a wire spring clamp through a notch; and in a second position, to receive a hoop-shaped end of a band spring clamp. The second contact point is configured to receive both an end portion of a wire spring clamp, and a tab-shaped end of a band spring clamp. The hose clamp pliers is provided with a thumb release cooperating with a ratcheting pawl to control opening and closing of the pliers arms, which opens and closes the hose clamp.

12 Claims, 6 Drawing Sheets

(56) References Cited

U.S. PATENT DOCUMENTS

| | | | | |
|---|---|---|---|---|
| 2008/0041198 | A1 | 2/2008 | Wu | |
| 2009/0064823 | A1 | 3/2009 | Huang | |
| 2010/0058895 | A1 | 3/2010 | Wu | |
| 2010/0071514 | A1 | 3/2010 | Idir | |
| 2012/0297603 | A1 | 11/2012 | Harrison | |
| 2013/0319165 | A1 | 12/2013 | Gillet et al. | |
| 2014/0290447 | A1* | 10/2014 | Schwierzke | B25B 7/04 81/385 |
| 2018/0333832 | A1 | 11/2018 | Liu | |

FOREIGN PATENT DOCUMENTS

| | | |
|---|---|---|
| FR | 2822095 | 3/2019 |
| TW | M261338 | 4/2005 |
| TW | M329506 | 1/2006 |
| TW | M435346 | 11/2012 |

OTHER PUBLICATIONS

CNWOOAIVE Spring Hose Clamp Pliers Swivel Jaw Wire Clip Plier Tool for Ring Type or Flat Band Hose Clamps Removal; Amazon.com; accessed 2023; 1 pg.

Snap-On Corbin Heater Hose Clamp Pliers Blue Point HCP9; Snap-On online store; accessed 2023; 1 pg.

Mac Tools Flat Band Hoses Clamp Pliers HCP734A; Mac Tools online store; accessed 2023; 1 pg.

Gear Wrench Heavy Duty Large Hose Clamp Pliers; Gear Wrench online store; accessed 2023; 1 pg.

KTool Knipex 85 59 250 A Spring Hose Clamp Replaceable Tips (for 85 51 250 AF) KTool online store; accessed 2023; 1 pg.

Mayhew Hose Clamp Plier Set 28655; Mayhew Online store; accessed 2023; 1 pg.

Mishimoto Hose Clamp Plier Set; 9 Pieces; Model MMTL-HOR-9; Mishimoto online store; accessed 2023; 1 pg.

Snap-On Mobea Heater Hose Clamp Pliers (Blue-Point) HCP10; Snap-On online store; accessed 2023; 1 pg.

Raptor Supplies UK Mag-Mate PLC300K Hose Clamp Plier Tip Kit; Raptor Supplies online store; accessed 2023; 1 pg.

Mac Tools Universal Corbin Hose Clamp Pliers HCP733A; Mac Tools online store; accessed 2023; 1 pg.

MAC Tools, Standard Straight Hose Clamp Pliers, Mac Tools online store; accessed 2023; 1 pg.

* cited by examiner

HOSE CLAMP PLIERS

CROSS-REFERENCE TO RELATED APPLICATIONS

This patent application is related to U.S. patents application Ser. Nos. 18/299,537, 18/299,559, 29/873,994, 29/873,996, and 29/873,997, all filed Apr. 12, 2023.

BACKGROUND OF THE INVENTION

The present invention relates to pliers, and more particularly, to hose clamp pliers designed for effortless and secure clamping and unclamping of hoses and other similar objects. Hose clamp pliers are a specialized type of pliers used for tightening or loosening hose clamps.

Hose clamps are well known in the art, and are used to attach and seal hoses to fittings such as pipes or tubes. Hose clamps are commonly used to secure hoses onto fittings or other objects, preventing leakage or detachment. Hose clamps can be loosened to allow removal or placement of the hose around its fitting, and then repositioned about the fitting and tightened to keep the hose in place around the fitting.

There are several different styles of hose clamps, including worm gear, t-bolt, ear, single and double wire, quick-release, and spring clamps. Spring clamps are preferred in automotive applications because they adapt to fluctuating temperatures within engine compartments which subject the hoses (and by extension, the hose clamps constraining those hoses) to expansion and contraction due to the fluctuating temperatures. The present invention relates to two commonly used styles of spring style hose clamps used in automotive applications: wire spring clamps and band spring clamps. Both of these styles are provide compressive leak-free seals because they are self-tensioning, as the resilient force of the metal which forms these styles of clamps urges and biases the hose clamp shut.

Wire spring clamps (also known as Corbin clamps) typically comprise heavy-gauge metal wire strap, circular in cross-section, which is formed into a circular shape. The two ends of the wire spring clamp overlap, and the resilient force of the metal urges and biases the hose clamp shut. The two ends of the wire spring clamp are pointed radially outwardly. When installing, removing, or repositioning a hose about its respective fitting, the ends of the wire spring clamp can be compressed towards one another to loosen the spring clamp. The ends are then released to re-tension the wire spring clamp about the hose.

A band spring clamp is a type of hose clamp that consists of a metal band or strap, typically made of a flat length of metal. Like the wire spring clamps, band spring clamps are formed into a circular shape with overlapping ends. A first end of the band spring clamp is nested within a void space provided towards a second end of the band style spring hose clamp. The result is that the two ends of the band spring clamp are of different shapes and sizes—at one end a smaller tab-shape, and at the other end, a larger hoop-shape. Also like the wire clamp, when installing, removing, or repositioning the band clamp, the two ends can be compressed towards one another to loosen the band clamp. The ends are then released to re-tension the band clamp about the hose.

Hose clamp pliers are designed to work with different types of spring hose clamps, and are often used in automotive, plumbing, and industrial applications. The pliers engage both ends of the spring hose clamps, and can be used to urge the ends of the hose clamp together to loosen the ends of the clamp together to loosen the clamp, and then released to allow the ends of the clamp to separate and allow the automatic self-tensioning of the clamp. Prior art hose clamp pliers are provided with a ratcheting mechanism that allows the user to lock the clamp in place at various stages of tightening or loosening, and the ratcheting mechanism can be disengaged so the jaws can work freely.

Different types of hose clamp pliers are used. Flathead plier heads are simple, flat blade pliers that are designed to fit over the tabs on the spring clamp and squeeze them together. Cable head pliers have a long, flexible cable instead of a rigid jaw, and the cable holds contact points to engage the spring clamp. This allows users to reach hose clamps in awkward locations and adjust the angle of the head as needed. Swivel head pliers have a head that can rotate 360 degrees. This allows users to access hose clamps from different angles, or to adjust the tool handles in relation to the hose clamp.

Prior art hose clamp pliers for wire spring clamps can be provided with two like contact points for engaging the circular in cross-section wire ends of the wire spring clamps. One design for this type contact point is a cup with a slot or groove formed at top portion of the cup.

Prior art hose clamp pliers for band spring clamps can also be provided with two different style contact points, with one style contact point designed to engage the smaller single tab-shape end of the band spring clamp (for example a contact point with a cup with or without a slot or groove formed at top portion of the cup, similar to a contact point for hose clamp pliers for a wire spring clamp), and the other style designed to engaged the larger hoop-shaped end of the band spring clamp (for example a fork-style contact point). One example of this contact point arrangement is shown in U.S. Pat. No. 6,128,975.

SUMMARY OF THE INVENTION

The present invention provides a hose clamp pliers that is specifically designed for effortless and secure clamping of hoses and other similar objects. The pliers comprise a pair of handles pivotally connected, and contact points positioned at a distal end of the tool. The contact points or jaws are configured to engage different end styles, including both spring style hose clamps and band spring clamps. In a first position, a single male contact point can effectively secure a radially outwardly directed cylindrical end of a wire spring clamp; and in a second position, the same male contact point can also effectively secure a hoop-shaped end of a band spring clamp. A single female contact point can effectively secure radially outwardly directed cylindrical ends of a wire spring clamp of different dimensions. The same single female contact point can also effectively secure the smaller tab-shape of a band spring clamp. In this manner the contact points of the present invention can engage both a band spring clamp and a spring style hose clamp without needing to change tools or change contact points.

The pliers also feature an engagement mechanism that keeps the jaws in a predetermined position resisting opening, allowing for hands-free operation once the contact points have been engaged with the spring clamp ends. The engagement mechanism comprises a lever or button that can be easily activated to restrain the jaws from opening. Moreover, the pliers can be designed to have a spring-loaded mechanism that allows for quick and easy opening of the jaws, facilitating efficient and time-saving clamping. In a thumb release disengaged position, the jaws are free to rotate or swing back and forth manually, or remain biased in a full open position in which a spring urges maximum separation of the jaws. Opening of the jaws is limited in the thumb release disengaged position by rotation one of the plier arms carrying a ratcheting pawl, which introduces a jaw stop contact surface of the ratcheting pawl against a handle jaw stop shoulder on the opposing plier arm, thereby limiting further opening of the jaws. In a thumb release engaged position, a ratcheting mechanism is engaged to tighten and keep the jaws in the predetermined position, or enabling tightening of the contact points and therefore the spring clamp end points to loosen the spring clamp about the hose.

Pliers typically comprise five portions: two handles, a pivot point, and two jaws or contact points carried by arms that extend from the pivot point. The right handle operates the left jaw about the pivot point, and the left handle operates the right jaw about the pivot point. Hose clamp pliers of the prior art have separate arms and handles. The present invention provides for a single piece blank which forms both the handles (preferably carrying grips) and the arms (carrying the unique contact points of at least one design of the present invention). The single piece blank and handle configuration can be repeated and identical for both right and left sides, thereby reducing manufacturing costs and complexity.

In a preferred embodiment, the contact points are independently rotatable which allows for articulation of the tool about the hose clamp.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

A counterbore is a cylindrical flat-bottomed hole that enlarges another hole, preferably coaxially. A countersink is a cylindrical conically shaped enlargement of another hole, preferably coaxially. Despite this technical difference, throughout this patent the terms are to be defined and used interchangeably.

Figure 1:
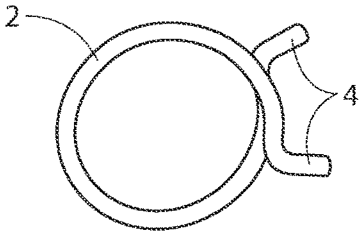
FIG. 1 is a side view of a spring clamp upon which the hose clamp pliers of the present invention can operate.

FIG. 1 is a side view of a wire spring clamp 2 upon which the hose clamp pliers of the present invention can operate. Metal wire is formed into a circular shape, and the two ends 4 of the wire spring clamp 2 overlap, and the resilient force of the metal urges and biases the hose clamp shut. The two ends 4 of the wire spring clamp are pointed radially outwardly. When installing, removing, or repositioning a hose about its respective fitting, the ends 4 of the wire spring clamp can be compressed towards one another to loosen the wire spring clamp 2. The ends are then released to re-tension the wire spring clamp 2 about a hose (shown later in the sequence of FIGS. 12A-E).

Figure 2:
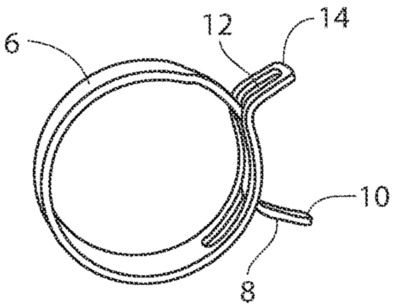
FIG. 2 is a side perspective view of a band spring clamp upon which the hose clamp pliers can operate.

Referring now to FIG. 2, a side perspective view of a band spring clamp 6 is shown, upon which the hose clamp pliers of the present invention can also operate. A flat length of metal is formed into a circular shape with overlapping ends. A first end of the band spring clamp 8 is nested between a void space 12 provided towards a second end 14 of the band style spring hose clamp 6. The result is that the two ends 8 and 14 of the band spring clamp are of different shapes and sizes. At one end a smaller tab-shape end 8 with a distal end 10 is created, and at the other end, a larger hoop-shaped end 14 is formed about void space 12. Like the wire spring clamp 2, when installing, removing, or repositioning the band spring clamp 6, the two ends 8 and 14 can be compressed towards one another to loosen the band spring clamp 6. The ends 8 and 14 are then released to re-tension the band spring clamp 6 about the hose, similarly to the sequence shown in FIGS. 12A-E for wire spring clamps.

Figure 3:
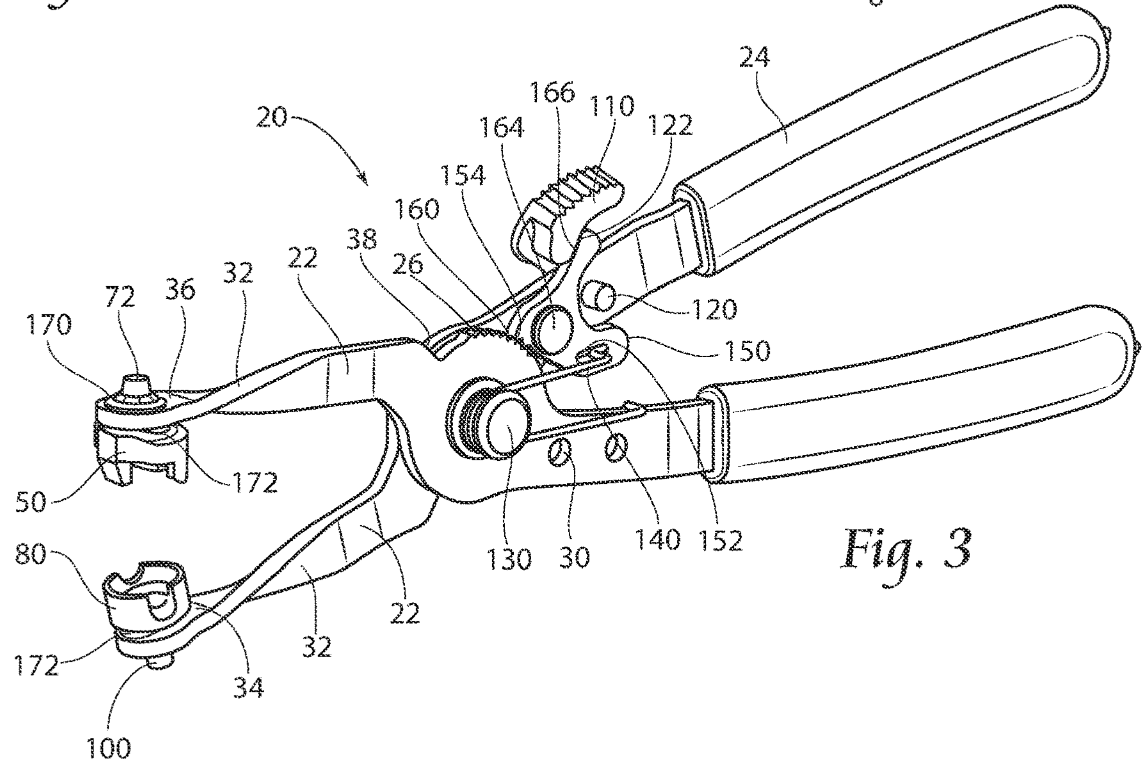
FIG. 3 is a front perspective view of hose clamp pliers.

Referring now to FIG. 3, a front perspective view of hose clamp pliers 20 is shown. First and second plier arms and handles 22 (of which a handle portion and an arm portion are on opposite ends of pivot point 130) are preferably each constructed of a single piece of flat metal. Grips 24 can be provided about a proximal portion forming a handle portion of arms 22. In a preferred embodiment, to simplify manufacturing, each arm 22 can be identical.

A male contact point 50 and a female contact point 80 are provided at distal end of the first and second plier arms 22. Each of the male and female contact points, 50 and 80, respectively, are coupled to the first and second plier handles 22 by contact point posts 72 and 100, respectively, which are inserted through void spaces on arms 22. Both the male and female contacts 50 and 80 are interior facing, or facing one another.

In a preferred embodiment, a curved disc spring 172 is provided between rear surfaces of the contact points and the jaw face 34 of plier handles 22. Also in a preferred embodiment, a push on external retaining nut 170 couples contact point posts 72 and 100 to the first and second plier handles 22 at rear jaw face 36.

In a preferred embodiment, in order to create inward facing jaw face 34 of each plier handle 22, a jaw twisted portion 32 is created in the initially flat piece of metal of the plier handles 22. Each arm 22 is twisted preferably 90° toward distal ends of arms 22, or between pivot point 130 and the contact points 50 and 80. Alternatively, a rolled end of plier handles 22 can be created as shown at reference numerals 12 and 22 of U.S. Pat. No. 6,389,937, which is incorporated by reference.

Each of the two plier handles and arms 22 rotate about a main joint rivet 130. At a portion of a periphery of a center portion of plier arms 22, plier handle teeth 26 are formed.

These plier handle teeth 26 engage corresponding teeth 154 carried by ratcheting pawl 150.

Figure 12A:
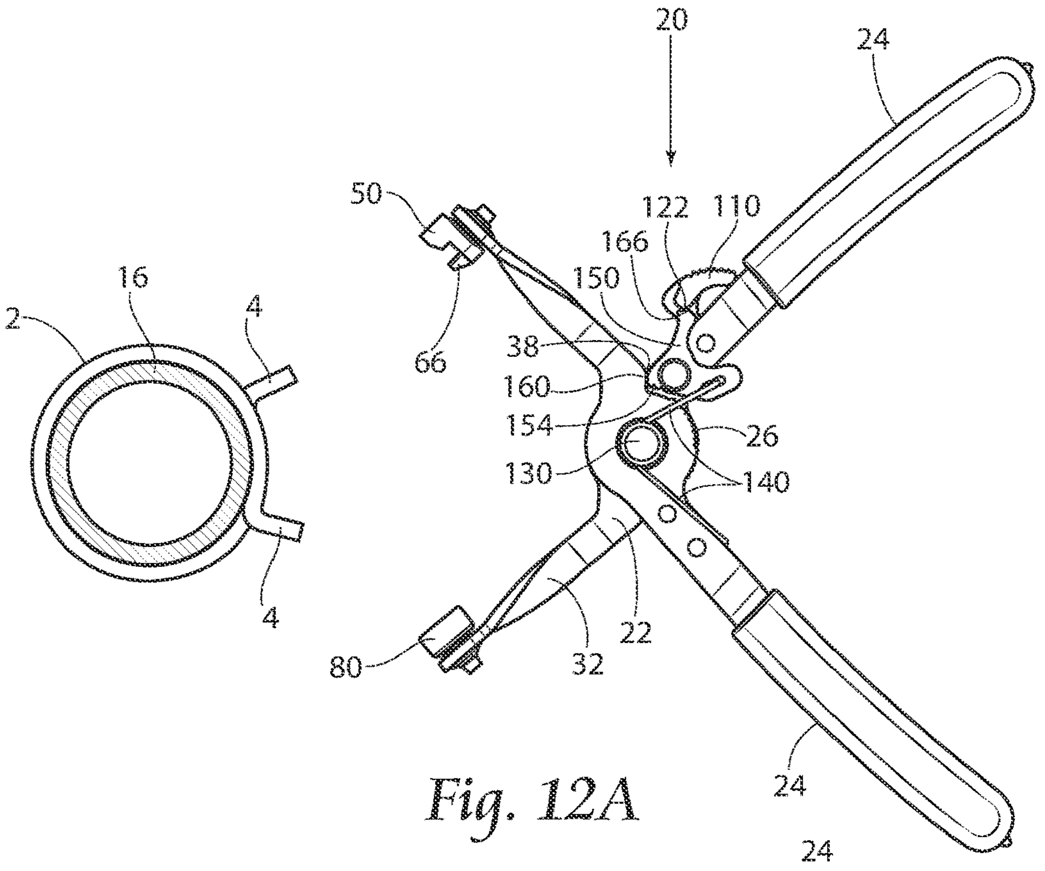
FIGS. 12A-12E demonstrate usage of the hose clamp pliers operating against a spring clamp.

In use, and as will be explained later, the plier handles 22 of the present invention can be operated in either a thumb release engaged position (as shown in FIG. 3) or a thumb release disengaged position (as shown in FIG. 12A). As shown in FIG. 3, the pliers 20 are in a thumb release engaged position, whereby the plier handle teeth 22 are engaged with corresponding teeth 154 carried by ratcheting pawl 150. In the thumb release engaged position, teeth 154 carried by ratcheting pawl 150 and plier handle teeth 26 can ratchet by squeezing grips 24 together, which simultaneously rotates plier handle teeth 26 clockwise, and rotates pawl teeth 154 clockwise. Engagement of teeth 26 and teeth 154 thus changes position upon squeezing, moving tooth pairings adjacently inwardly one click at a time.

In use, a user can change between thumb release engaged and disengaged positions by pivoting thumb release 110, which is preferably knurled. In response to a rearward push by a user, thumb release 110 pivots about thumb release rivet 120, which is provided in one of the void spaces 30 provided on each plier handle 22. Pressing inwardly and rearward on thumb release 110 will reposition teeth 154 away from and out of engagement with teeth 26 by pivoting ratcheting pawl 150 about ratcheting pawl rivet 164 (pivotally coupled to its plier handle 22 through a void space 30). Pivot spring 140 is coupled to one of the plier handles 22, and also coupled to the ratcheting pawl 150 through pivot spring void space 152. Pivot spring 140 is biased to urge the grip portions 24 of plier handles 22 away from one another (as well as forcing the male and female contact points 50 and 80 away from each other), as will be described later. In the thumb release disengaged position, the contact points 50 and 80, and the grips 24 are free to rotate or swing back and forth manually, or remain biased in a full open position in which spring 140 urges maximum separation of the contact points 50 and 80.

Figure 4:
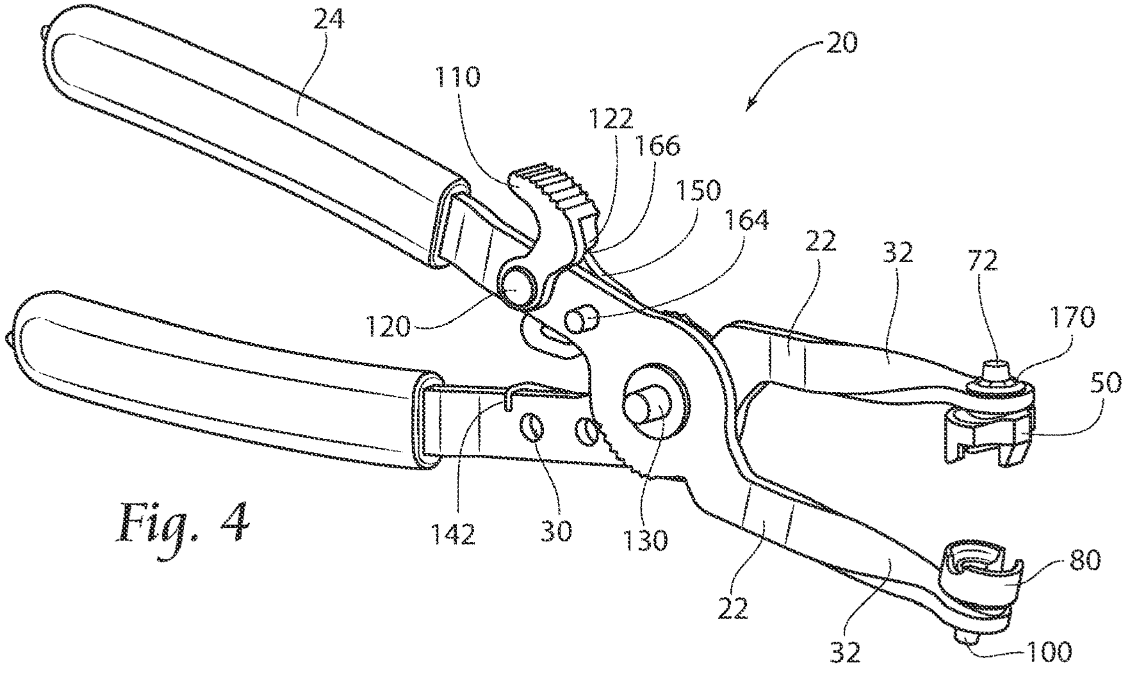
FIG. 4 is a rear perspective view of the hose clamp pliers of FIG. 3.

Referring now to FIG. 4, in a preferred embodiment, thumb release 110 is pivotally coupled at a rear surface of one of the plier handles 22, while ratcheting pawl 150 is pivotally coupled to a front surface of the same plier handle 22 (as shown in FIG. 3). Thumb release 110 spans from the rear surface of its plier handle 22 across to the front surface of its plier handle 22, where ratcheting pawl thumb release contacting surface end portion 166 can react with thumb release ratcheting pawl tab contact surface distal portion 122. Bent spring end 142 is wrapped around the arm 22 which does not carry thumb release 110.

Figure 5:
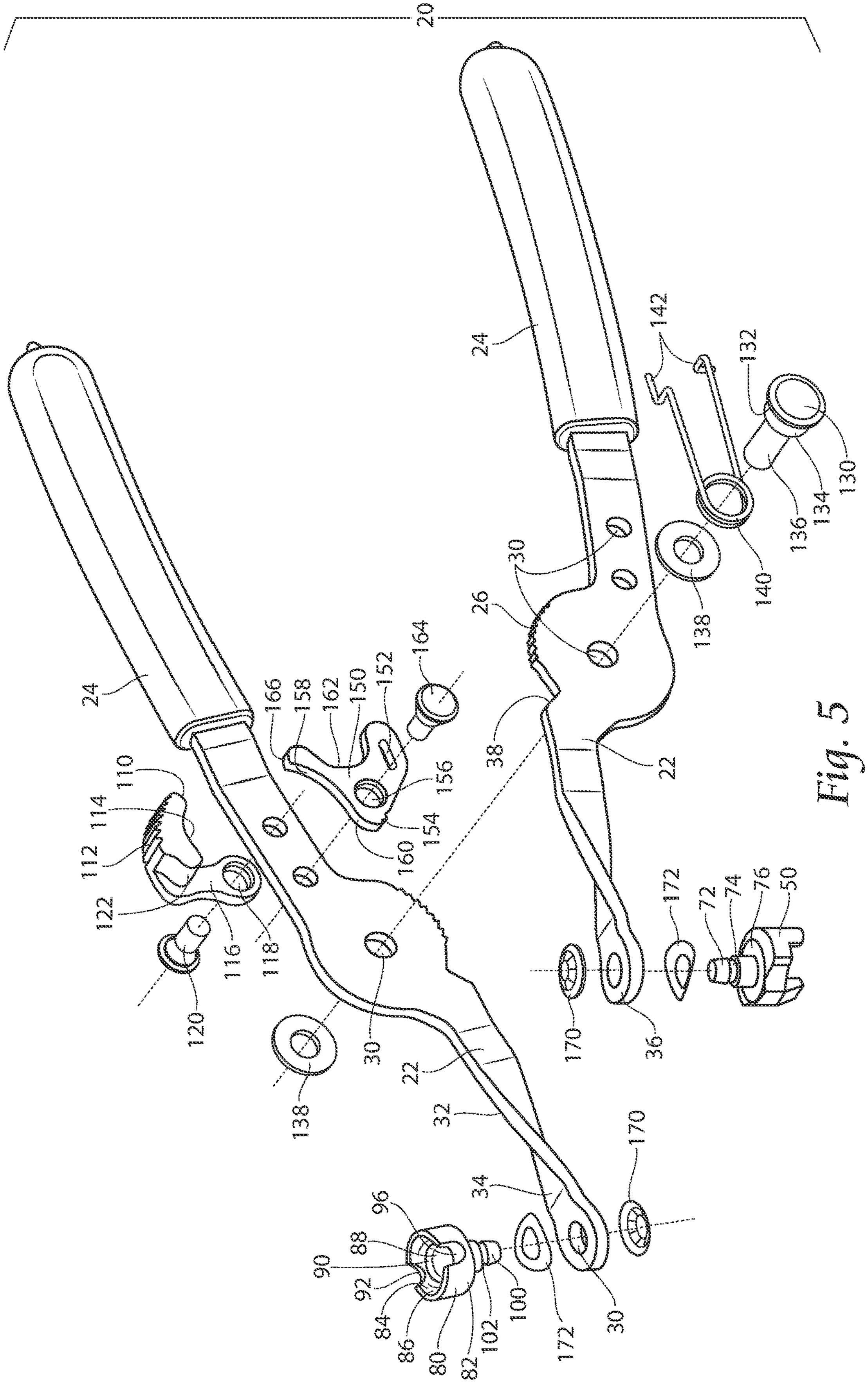
FIG. 5 is an exploded perspective view of components of the hose clamp pliers.

Referring now to FIG. 5, an exploded perspective view of components of the hose clamp pliers 20 is shown. Beginning with female contact point 80, a generally cup shaped contact point 80 is provided. A preferably generally U-shaped female contact point first notch 92 is created through sidewall 82, and preferably a deeper preferably generally U-shaped female contact point second notch 96 is provided diametrically opposed to the female contact point first notch 92. A female contact point large diameter counterbore 84 is provided within the female contact point 80, creating female contact point large diameter counterbore sidewall 86. Within female contact point large diameter counterbore 84, and created deeper than counterbore 84, a second, small diameter counterbore 88 is provided. The small diameter counterbore 88 has a sidewall 90 depending from the large diameter counterbore 84 to the small diameter counterbore 88. A female contact point post 100 is formed at a base of female contact point 80, about which a post groove 102 is formed in order to be coupled with, and receive push on external retaining nut 170. During assembly, curved disk spring 172 is provided between jaw face 34 and sidewall 82, to facilitate snug rotation of female contact point 80 about its post 100 when desired.

Figure 8A:
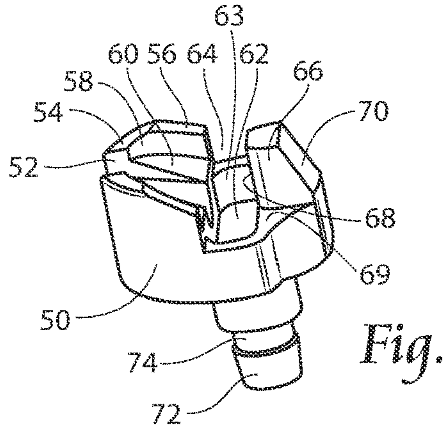
FIG. 8A is a top perspective view of a male contact point.
Figure 8B:
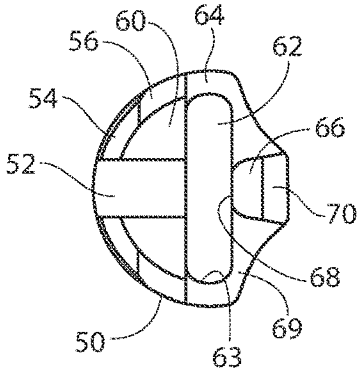
FIG. 8B is a top view of the male contact point of FIG. 8A.

Male contact point 50, the unique shape of which will be described later in relation to FIGS. 8A and 8B, is similarly installed upon its arm 22, with male contact point post 72 inserted through a void on arm 22. Push on external retaining nut 170 is received in male contact point post groove 74, and curved disk spring 172 is placed between male contact point rear surface 76 and jaw front face 34.

Referring now to main joint rivet 130, this rivet is formed with a spring stop 132 about a proximal end of the rivet 130. A rivet large diameter 134, for spring 140 to ride and rotate upon, extends to a rivet small diameter 136 which is preferably snug fit within its associated handle void space 30. The main joint rivet 130 is inserted through spring 140, joint washer 138, a handle void space 30 of the first plier arm 22, a second handle void space 30 of the second plier arm 22, and an additional joint washer 138. A distal end of main joint rivet 30 can be provided with, for instance, a rivet head or other engagement means to keep main joint rivet 130 in place with respect to plier arms 22. Rivet large diameter 134 carries a looped portion of spring 140, and rivet large diameter 134 is preferably larger than handle void space 30, leaving space for spring 140 to rotate and operate.

Referring now to ratcheting pawl 150, this structure contains a pivot spring void space 152 to receive a bent spring end 142 of spring 140, as shown in FIG. 3. Preferably a series of ratcheting pawl teeth 154 are provided at a portion of an outer periphery of ratcheting pawl 150. A rivet void space 156 is provided, to receive therethrough a pawl rivet 164 which also is placed through a void space on the plier arm 22, and pawl rivet 164 can be coupled to the plier arm 22 by any means. In a preferred embodiment ratcheting pawl 150 is provided at a front surface of its associated plier arm 22. A shoulder, or ratcheting pawl jaw stop contact surface 160 is provided to selectively contact, during a maximum open condition of pliers 20, against handle jaw stop shoulder 38 of the other of the plier arms 22, as will be described later. A thumb release contacting service 158, preferably curved, is provided to contact ratcheting pawl tab contact surface 114 of thumb release 110. Ratcheting pawl tab contact surface 114 can ride upon thumb release contacting service 158 as grips 24 are squeezed to ratchet the pliers 20 closed. A ratcheting pawl thumb release contacting surface end portion 166 is provided to engage release ratcheting pawl tab contact surface distal portion 122 in the thumb release disengaged position as shown in FIG. 12A. A ratcheting pawl rivet clearance surface 162 is provided to accommodate thumb release rivet 120 (see FIG. 3).

Thumb release 110 is preferably provided with thumb release grip feature 112, preferably a series of ridges. Thumb release base portion 116 containing rivet hole 118 is provided in a preferred embodiment at a rear surface of its plier arm 22. Rivet 120 couples thumb release to its plier arm 22.

Figure 6:
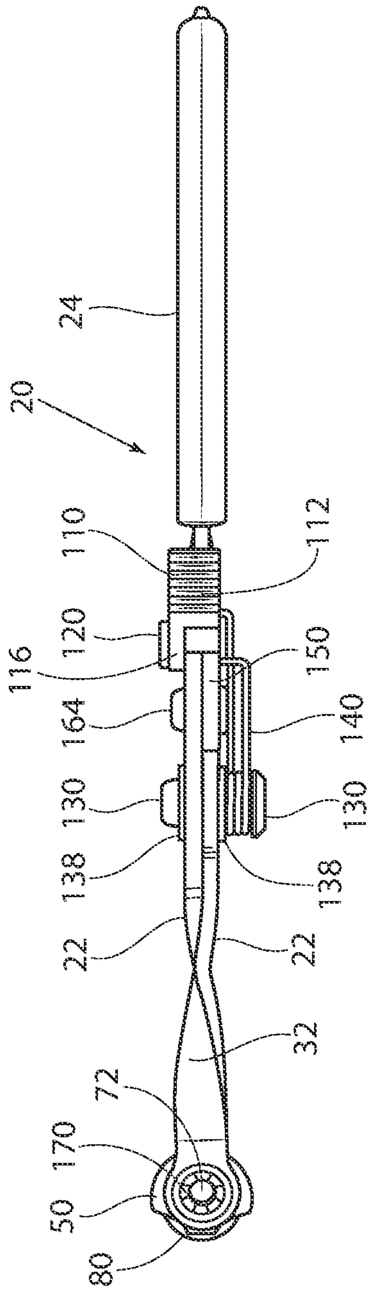
FIG. 6 is a side view of hose clamp pliers.

Referring now to FIG. 6, a side view of hose clamp pliers 20 is shown. Contact points 50 and 80 are aligned to travel towards one another in this view, despite one of the arms 22 overlying the other. This alignment of contact points 50 and 80 is facilitated by twisted portions 32.

Figure 7:
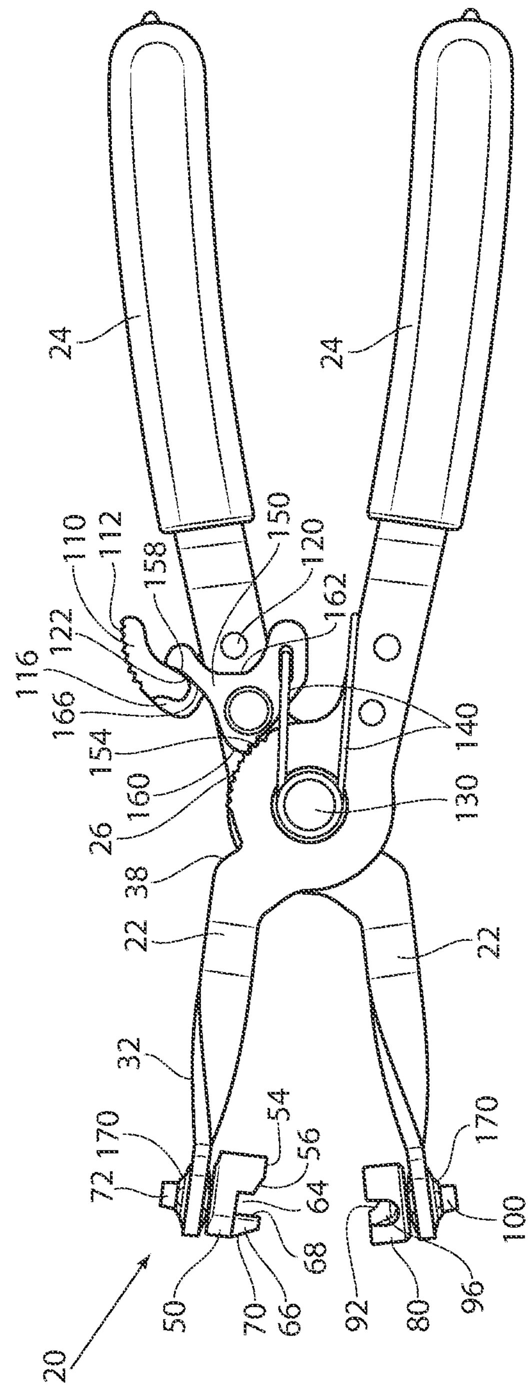
FIG. 7 is a top view of hose clamp pliers.

Referring now to FIG. 7, a top view of hose clamp pliers 20 is shown in the thumb release engaged position. Male contact point 50 is provided with a keeper 66, the use of which will be described later. A front exterior wall 70 (preferably sloped) of keeper 66, and an interior wall 68 (preferably flat and vertical), are formed on keeper 66 of male contact point 50. An open ended channel 64 spans male contact point 50. A top rear wall 54 of male contact point 50 leads to an inward sloping portion 56 of top wall 54. From the thumb release engaged position, a user can squeeze grips 24 together to decrease the distance between male and female contact points 50 and 80. Squeezing grips 24 together relocates ratcheting pawl teeth 154 downwardly with respect to plier handle teeth 26, one tooth position (click) at a time.

Referring now to FIGS. 8A and 8B, a top perspective and a top view, respectively, of male contact point 50 is shown. Male contact point 80 is designed to receive, engage and control either cylindrical end 4 of the wire spring clamp 2 (FIG. 1), or the hoop-shaped end 14 of band spring clamp 6 (FIG. 2).

Male contact point post 72 and male contact point post groove 74 are provided in order to couple the male contact 50 to an arm 22, as described previously. Keeper 66 is a protrusion extending upwardly from base surface 69. The width and height of keeper 66 are preferably sufficient to fit within and grasp the hoop-shaped end 14 of band spring clamp 6 (see FIG. 11).

A closed ended channel 62, adjacent to keeper 66, is formed within male contact point 50, and an open ended channel 64 spans above closed ended channel 62 and across a width of male contact point 50. Closed ended channel 62 is sized widthwise to receive and control hoop-shaped end 14. If a hoop-shaped end 14 wider than closed ended channel 62 is encountered, the wider hoop-shaped end 14 can be placed within open ended channel 64.

A contact point notch 52, preferably U-shaped, is formed through top wall 54. Notch 52 extends from an exterior of male contact point 50 spanning to open ended channel 64 above closed ended channel 62.

Preferably, an inward the sloping portion 56 of top wall 54 is provided. An interior sloped surface 60 is formed between top wall 54 depending inwardly to open ended channel 64. This sloped surface 60 encourages hoop-shaped end 14 into either closed ended channel 62 (preferably) or open ended channel 64. Interior sidewall 58 extends from interior sloped surface 60 to top wall 54.

The keeper 66 of male contact point 50 is provided with interior wall 68, preferably flat, and downwardly and outwardly depending exterior wall 70.

Figure 9A:
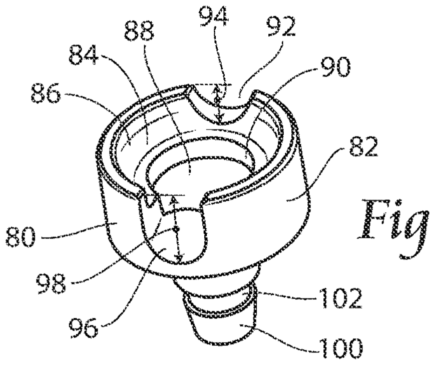
FIG. 9A is a top perspective view of a female contact point.
Figure 9B:
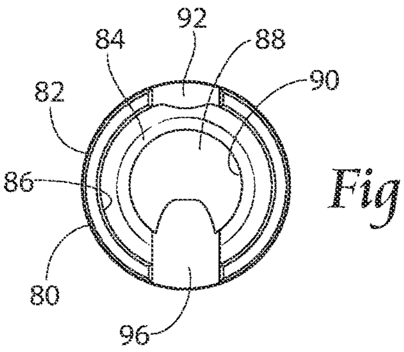
FIG. 9B is a top view of the female contact point of FIG. 9A.

Referring now to FIGS. 9A and 9B, a top perspective and a view of a female contact point 80 is shown. Female contact point post 100 and contact point post groove 102 are provided in order to couple the female contact 80 to an arm 22, as described previously.

Female contact point 80 is designed to receive, engage and control either a cylindrical end 4 of wire spring clamp 2 (FIG. 1), or engage the flat tab shaped end 10 of band spring clamp 6 (FIG. 2). A first larger diameter counterbore or countersink 84 is formed within female contact point 80. A smaller diameter counterbore 88 is formed, preferably concentrically, within the larger diameter counterbore 84. A first notch, or slot, or groove 92 (these terms are used interchangeably herein) is formed in a sidewall 82 of the female contact point 80, the first notch 92 preferably larger in width than the diameter of the intended size of the cylindrical end 4 of the wire spring clamp 2, and wider than the width of the intended flat tab shaped end 10 of band spring clamp 6. The notch 92, preferably U-shaped, extends from an exterior wall 82 of the female contact point 80, through the larger diameter counterbore 84 and its associated sidewall 86, and optionally into the smaller diameter counterbore 88.

A second preferably U-shaped notch 96 is provided diametrically opposed to notch 92. This notch 96 preferably extends from exterior wall 82 of the female contact point 80, through the larger diameter counterbore 84 and its associated sidewall 86, and also through small diameter counterbore sidewall 90 of the small diameter counterbore 88, leading into small diameter counterbore 88. In a preferred embodiment, depth 94 of notch 92 is less than depth 98 of notch 96.

Figure 10:
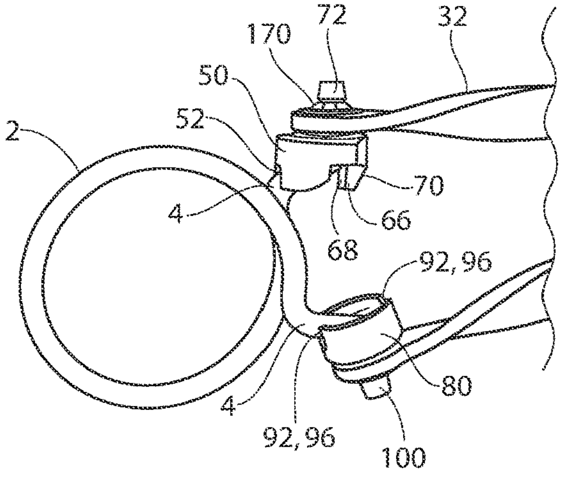
FIG. 10 is a close-up view of a male and a female contact point engaged with a wire spring clamp.

Referring now to FIG. 10, a close-up view of male and female contact points 50 and 80 respectively is shown, with contact points 50 and 80 engaged with wire spring clamp 2.

Referring first to female contact point 80, in use for a wire spring clamp 2, either female contact point notch 92 or 96 can hold one end 4 of wire spring clamp 2. The notches 92 or 96 can prevent the end 4 of wire spring clamp 2 from rolling left and right in relation to the female contact point 50. Female contact point 50 can independently rotate with respect to twisted portion 32, allowing the grips 24 of the hose clamp pliers 20 to rotate about the position of the hose clamp being worked upon in hard to reach places. Notches 92 or 96 also keep the spring clamp 2 on center, helping dissipate clamping force when pressure is applied to the pliers 20, and allowing for easier pivoting of the grips 24 relative to the contact point 50 when the contact point 50 is affixed to the spring clamp 2. The end 4 of wire spring clamp 2 being held by female contact point 80 can be constrained by one of the counterbore sidewalls 90 or 86 (refer to FIG. 9A), preferably by the sidewall 90 of the smaller diameter counterbore 88, for greater control of the end 4 of wire spring clamp 2. This allows for greater control over the end 4 of wire spring clamp 2.

Referring next to male contact point 50, in use on wire spring clamp 2, the male contact point notch 52 holds the other end 4 of wire spring clamp 2. The male contact point 50 is rotated about its post 72 into a position in which keeper 66 is closest to grip 24 (facing right as shown in FIG. 10). This exposes notch 52 to end 4. The notch 52, similar to notches 92 and 96 of female contact point 80, can prevent end 4 from rolling left and right in relation to the male contact point 90. This in turn allows independent rotation of the male contact point 50 with respect to the grips 24, about post 72. The end 4 can be constrained within notch 52, with best control over end 4 when end 4 contacts keeper interior wall 68.

Figure 11:
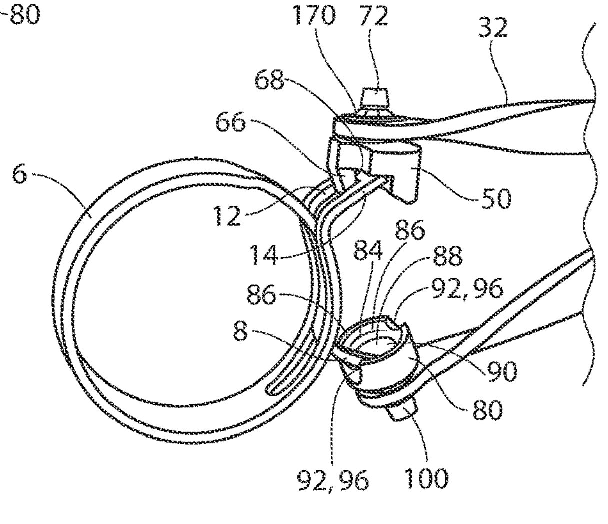
FIG. 11 is a close-up view of the male and female contact points engaged with a band spring clamp.

Referring now to FIG. 11, a close-up view of the male and female contact points 50 and 80 engaged with band spring clamp 6 is shown.

In use for a band spring clamp 6, female contact point 80 is also designed to receive, engage and control the tab-shape end 8 of the band spring clamp 6. The flat end 8 of the hoop-shaped end of band spring clamp 6 extends through either notch 92 or 96, and flat end 8 is preferably engaged against a positive stop, for instance resting against either large diameter sidewall 86, or preferably and as shown, small diameter counterbore sidewall 90.

Referring now to male contact point 50 controlling hoop-shaped end 14, to engage band spring clamp 6 with male contact point 50, a user places the male contact point 50 into a position in which keeper 66 is farthest from grip 24 (facing left as shown).

Keeper 66 is placed within void space 12 of hoop-shaped end 14 of band spring clamp 6, for positive securement of the hoop-shaped end 14, and prevention of rotation of the hoop-shaped end 14. Interior wall 68 of keeper 66 can apply an inward pulling force against hoop-shaped end 14 as contact points 50 and 80 are drawn toward one another as a user squeezes grips 24. Hoop-shaped end 14 can rest within closed ended channel 62 and against sidewall 63 (not visible from the viewpoint in FIG. 11, instead see FIGS. 8A and 8B). During installation of hoop-shaped end 14 into male contact point 50, interior sidewall 58 acts as a stop against which hoop-shaped end 14 can be contained briefly, until hoop-shaped end 14 is guided down interior sloped surface 60 and into closed ended channel 62 (or open ended channel 64). In the case of a hoop-shaped end 14 wider than closed ended channel 62, hoop-shaped end 14 can span across closed ended channel 62 to be received within open ended channel 64.

Referring now to FIGS. 12A-12E usage of the hose clamp pliers 20 operating against a spring clamp 2 is shown. Spring clamp 2 is placed about hose 16, where spring clamp 2 rests in a biased closed position.

Beginning with FIG. 12A, the pliers 20 are in the thumb release disengaged position, with grips 24 (and therefore contact points 50 and 80) wide open, and ratcheting pawl jaw stop contact surface 160 resting against handle jaw stop shoulder 38 of the top arm 22. Travel in the open direction is limited by ratcheting pawl jaw stop contact surface 160 resting against handle jaw stop shoulder 38. In the thumb release disengaged position, thumb release 110 is positioned behind (or above in this view) ratcheting pawl 150 relative to pivot point 130, and ratcheting pawl thumb release contacting surface end portion 166 is in contact with thumb release ratcheting pawl tab contact surface distal portion 122. In the thumb release disengaged position, teeth 154 and 26 are separated or disengaged.

Because pliers 20 is being used with a spring clamp 2 in the example shown in the sequence of FIGS. 12A-12E, keeper 66 is oriented closest to pivot point 130. Alternatively, if pliers 20 were being used with a band spring clamp 6, keeper 66 would be oriented 180° from that position, with keeper 66 farthest from pivot point 130 (see FIG. 11).

Figure 12B:
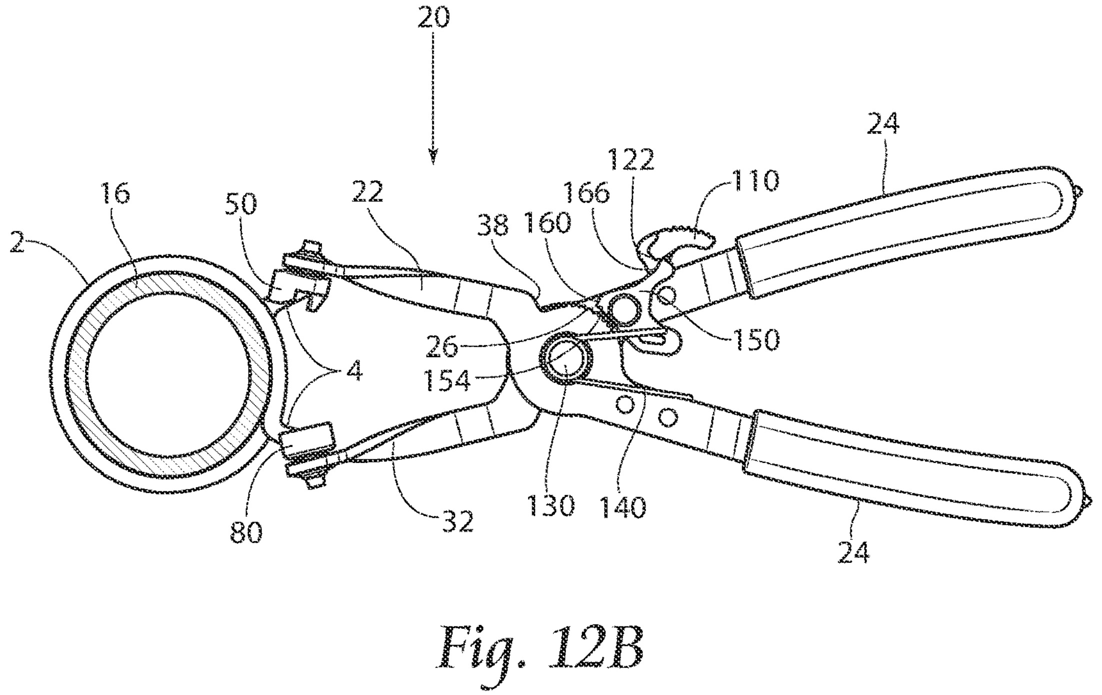

Referring now to FIG. 12B, pliers 20 remain in the thumb release disengaged position, and contact points 50 and 80 have been brought into receiving contact with spring ends 4 by squeezing grips 24 together. At the user's choice, pliers 20 could also be in the thumb release engaged position to draw contact points 50 and 80 into receiving contact with spring ends 4.

Figure 12C:
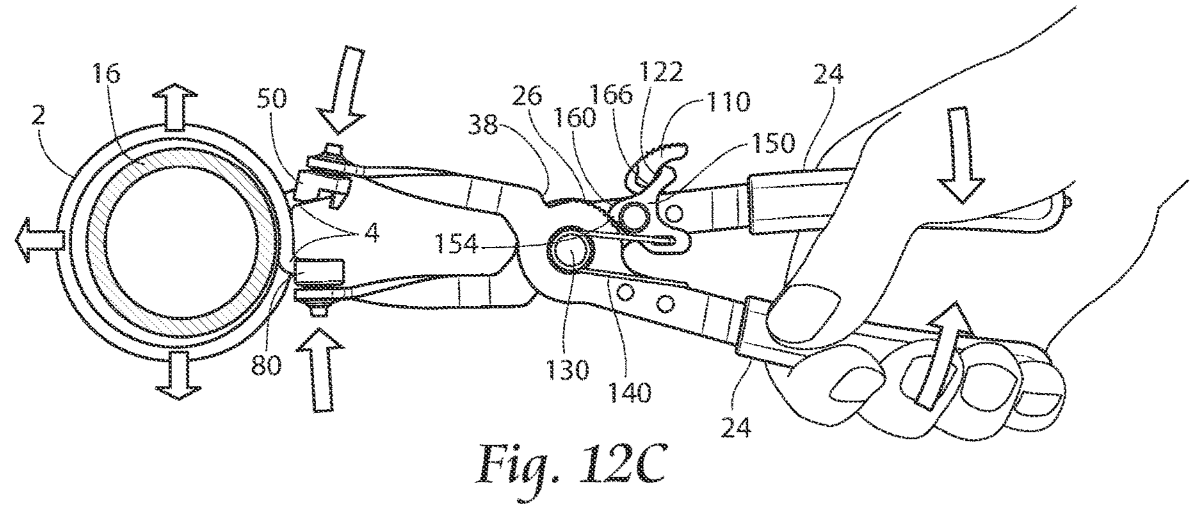

Next, if the pliers 20 are not already in the thumb release engaged position, thumb release 110 can be rotated over ratcheting pawl 150 (to the left as shown in relation to the position of thumb release 110 as shown in FIG. 12B) to place the thumb release 110 in the position shown in FIG. 12C. A user squeezes grips 24 together, drawing contact points 50 and 80 closer together, thereby loosening spring clamp 2 relative to hose 16. If a user releases grips 24 in the thumb release engaged position, contact points 50 and 80 are kept in position and now allowed to open. Spring clamp 2 can then be manipulated as desired.

Figure 12D:
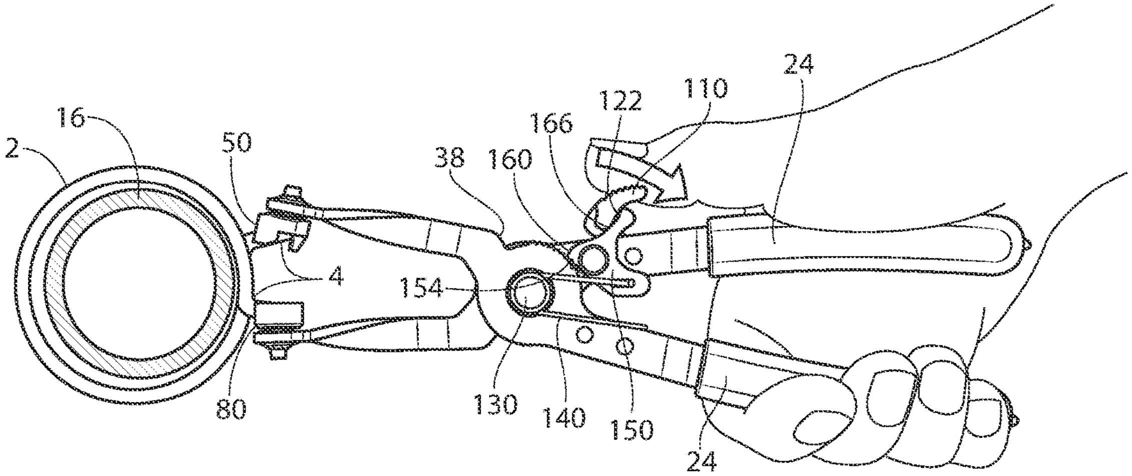
Figure 12E:
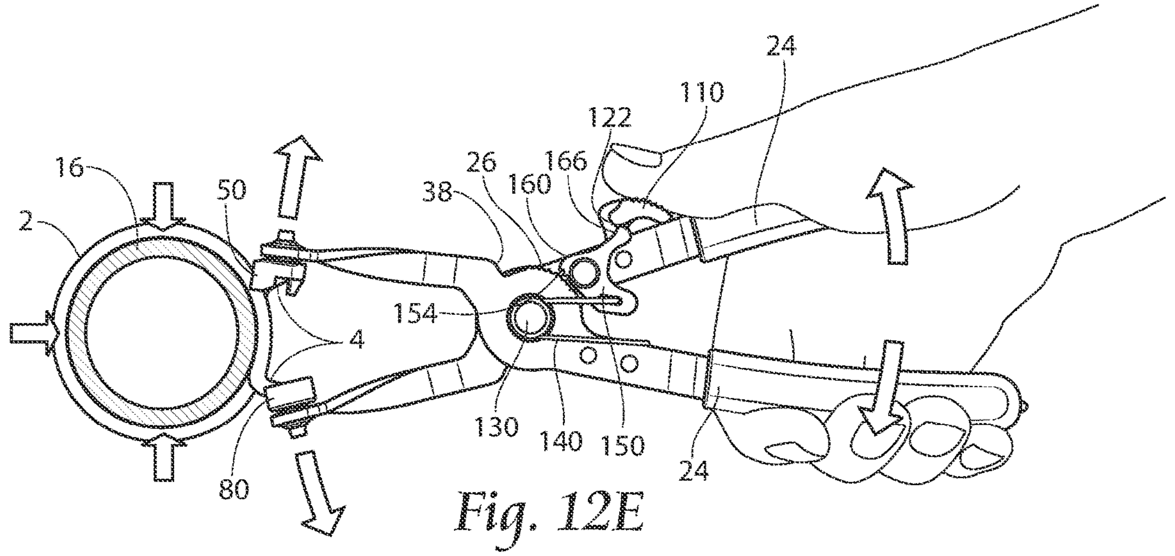

Referring now to FIG. 12D, after spring clamp 2 has been adjusted relative to hose 16 as spring clamp 2 is open, while retaining a squeezing force against grips 24, the user can place the pliers 20 in the thumb release disengaged position by simultaneously squeezing grips 24 and pulling back against thumb release 110, until the thumb release 110 reaches the position shown in FIG. 12E and the teeth 154 and 26 are disengaged. As the user weakens the squeeze on grips 24 as shown in FIG. 12E, contact points 50 and 80 are separated by action of spring 140, allowing the spring clamp 2 to relax and tighten back up against hose 16. At this point, the user is free to remove pliers 20 from the spring clamp 2, returning the pliers to the position shown in FIG. 12A.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A contact point for use with a hose clamp pliers, said hose clamp pliers for use with a wire spring clamp and a band spring clamp, said contact point comprising:

a notch through a sidewall of said contact point, said notch comprising a first width;

a keeper comprising a protrusion extending from a base surface of said contact point;

a sloped surface spanning said notch, said sloped surface sloped towards a closed ended channel formed in said contact point between said notch and said keeper, said closed ended channel comprising a second width greater than said first width, said closed ended channel comprising a first channel sidewall and a second channel sidewall, said first channel sidewall and said second channel sidewall depending from said base surface of said contact point;

a first keeper sidewall less than said second width, said first keeper sidewall positioned adjacent to said first channel wall, said notch positioned adjacent to said second channel wall;

a second keeper sidewall extending from said base surface;

a first top rear wall positioned on a first side of said notch, a first interior sidewall depending from said first top rear wall to said sloped surface;

a second top rear wall positioned on a second side of said notch, a second interior sidewall depending from said second top rear wall to said sloped surface; and an open ended channel spanning said closed ended channel, said open ended channel comprising a bottom surface defined by at least a portion of said base surface, a first side of said open ended channel defined by said first keeper sidewall, and a second side of said open ended channel defined by an open-ended channel rear wall depending from said closed ended channel to said base surface, said open ended channel comprising a third width greater than said second width.

2. The contact point according to claim 1, said keeper, said notch and said sloped surface depending into said closed ended channel.

3. The contact point according to claim 2, wherein said closed ended channel comprises a depth less than said second width.

4. A contact point for use with a hose clamp pliers, said hose clamp pliers for use with a wire spring clamp and a band spring clamp, said contact point comprising: a notch through a sidewall of said contact point, said notch comprising a first width; a keeper protruding from said contact point; a sloped surface spanning said notch, said sloped surface sloped towards a closed ended channel formed in said contact point between said notch and said keeper, said closed ended channel comprising a second width greater than said first width; said contact point further comprising an open ended channel formed through said sidewall of said contact point, said open ended channel bounded by said keeper and a wall surface depending from said sloped surface.

5. The contact point according to claim 1, said notch extending towards said keeper.

6. The contact point according to claim 1, said notch carrying an end portion of said wire spring clamp towards said keeper.

7. The contact point according to claim 1, said notch positioned across said contact point diametrically opposed to said keeper.

8. The contact point according to claim 1, said keeper sidewall extending towards at least one of the closed ended channel and said open ended channel formed in said contact point.

9. The contact point according to claim 1, said contact point carried by an arm of said hose clamp pliers.

10. The contact point according to claim 1, said first channel sidewall and said second channel sidewall comprising parallel opposing surfaces.

11. The contact point according to claim 4, said open ended channel spanning said closed ended channel.

12. A contact point for use with a hose clamp pliers, said hose clamp pliers for use with a wire spring clamp and a band spring clamp, said contact point comprising: a notch through a sidewall of said contact point, said notch comprising a first width; a keeper protruding from said contact point; a sloped surface spanning said notch, said sloped surface sloped towards a closed ended channel formed in said contact point between said notch and said keeper, said closed ended channel comprising a second width greater than said first width; said sloped surface comprising a pair of parallel planar surfaces spanning said notch towards said keeper.

* * * * *